(12) United States Patent
Shukla et al.

(10) Patent No.: US 10,367,856 B2
(45) Date of Patent: Jul. 30, 2019

(54) FAILOVER MANAGEMENT OF SIP BASED MULTIMEDIA COMMUNICATION SESSIONS

(71) Applicant: Sterlite Technologies Limited, Ahmedabad (IN)

(72) Inventors: Kalpesh Shukla, Ahmedabad (IN); Shiv Premani, Ahmedabad (IN); Sumit Pandya, Ahmedabad (IN)

(73) Assignee: STERLITE TECHNOLOGIES LIMITED, Maharashtr (IN)

( * ) Notice: Subject to any disclaimer, the term of this patent is extended or adjusted under 35 U.S.C. 154(b) by 272 days.

(21) Appl. No.: 15/379,273

(22) Filed: Dec. 14, 2016

(65) Prior Publication Data
US 2018/0167420 A1 Jun. 14, 2018

(51) Int. Cl.
| | |
|---|---|
| G06F 15/16 | (2006.01) |
| H04L 29/06 | (2006.01) |
| H04L 12/14 | (2006.01) |
| H04L 29/14 | (2006.01) |
| H04M 15/00 | (2006.01) |

(52) U.S. Cl.
CPC .......... H04L 65/1083 (2013.01); H04L 12/14 (2013.01); H04L 65/105 (2013.01); H04L 65/1006 (2013.01); H04L 69/40 (2013.01); H04M 15/57 (2013.01); H04M 15/63 (2013.01)

(58) Field of Classification Search
CPC .............. H04L 65/1083; H04L 65/105; H04L 65/1006; H04L 69/40; H04L 12/14
See application file for complete search history.

(56) References Cited

U.S. PATENT DOCUMENTS

2008/0098117 A1* 4/2008 Fukuhara ................ H04L 69/40
709/227
2008/0304471 A1* 12/2008 Jackson .............. H04L 65/1076
370/352

* cited by examiner

Primary Examiner — Richard G Keehn
(74) Attorney, Agent, or Firm — Lowenstein Sandler LLP

(57) ABSTRACT

Systems and methods for failover recovery of multimedia communication sessions are disclosed. A system may store active session information received from a first session initiation protocol (SIP) server in a data store. The active session information includes information for an active session between a first user agent and a second user agent The system may further determine that the first SIP server is not available and provide the active session information associated with the first SIP server to a second SIP server. The system may then cause the second SIP server to provide a first Re-INVITE message to the first user agent and a second Re-INVITE message to the second user agent, wherein the first Re-INVITE message is constructed using the active session information as saved in the data store.

20 Claims, 6 Drawing Sheets

FAILOVER MANAGEMENT OF SIP BASED MULTIMEDIA COMMUNICATION SESSIONS

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
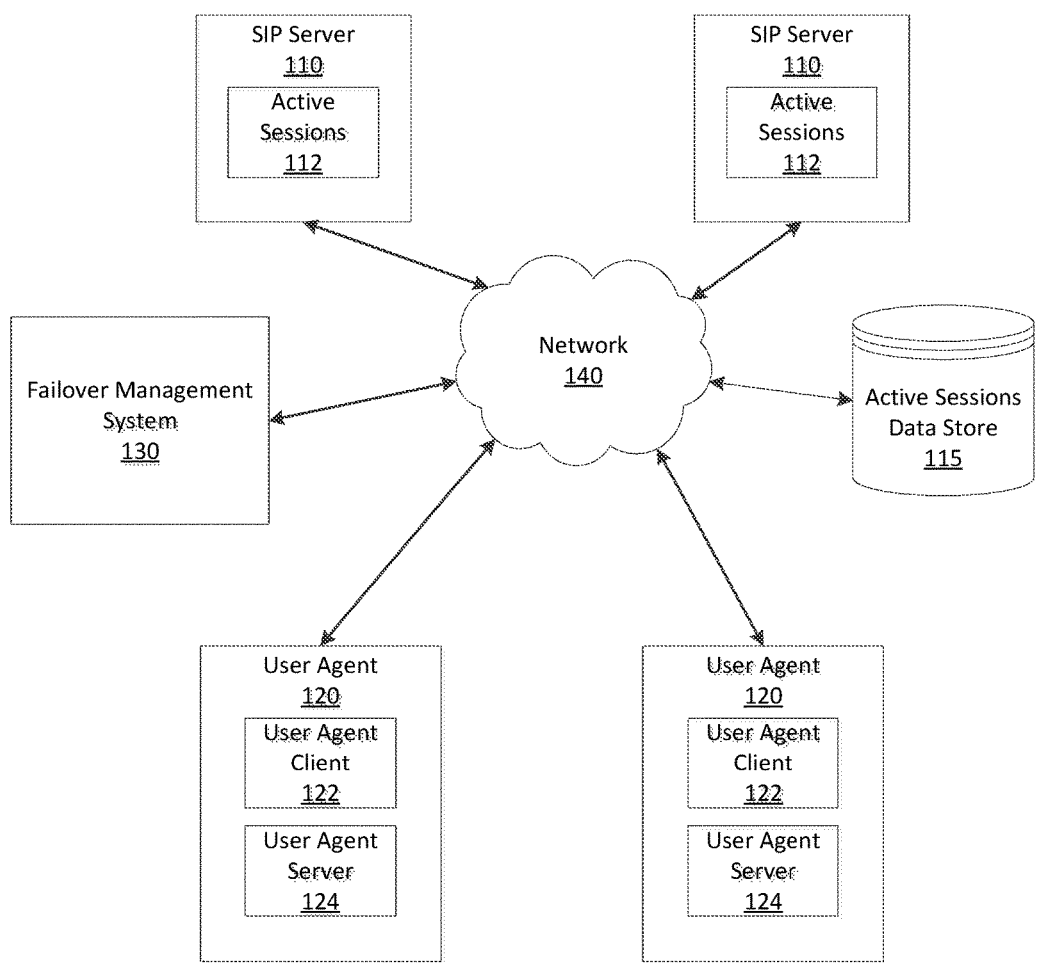
FIG. 1 depicts a block diagram of a failover management system, according to one or more aspects of the present disclosure.

Described herein are methods and systems for handling failover events of multimedia communication sessions. A peer server in a multimedia communication system may provide session continuity in the event that a primary server fails. The peer server may use active session information from the primary server to re-establish the active connections without a noticeable disruption in the multimedia communication sessions. Accordingly, each multimedia communication session may be maintained. Billing and recording of the existing multimedia communication sessions may also be maintained during failover events associated with the primary server.

A multimedia communication system may provide services for multimedia communication sessions over a network connection. For example, multimedia communications sessions may include voice calls, video calls, instance messaging or other multimedia communications. The multimedia communications may be sent through a network connection over an internet protocol (IP) network. An example protocol for signaling and controlling multimedia communications sessions is the session initiation protocol (SIP). Although the systems and methods disclosed herein may be used with other protocols, the description uses SIP as an example protocol for clarity. Therefore, in some embodiments, descriptions of operations relating to SIP may be performed using different protocols or messages for handling communication sessions.

In some embodiments, the SIP defines the messages that are sent between endpoints of a communication session to govern establishment, termination, features, and other elements of a call. Accordingly, SIP can be used for creating, modifying and terminating sessions consisting of one or several media streams. In some embodiments, the SIP may be an application layer protocol designed to be independent of the underlying transport layer. The SIP may be a text-based protocol incorporating elements similar to the Hypertext Transfer Protocol (HTTP) or the Simple Mail Transfer Protocol (SMTP).

To establish and control a multimedia communication session, a SIP server may control signaling and data transmissions between multiple endpoints. An endpoint may be a user agent, such as a phone, a server, or another computer system. A user agent may include a user agent client (UAC) that generates and sends network service requests. A user agent may also include a user agent server (UAS) that responds to requests from a UAC. In some embodiments, a user agent may include both a UAC and a UAS to generate and respond to various requests in a multimedia communication system.

In some embodiments, a multimedia communication system may use SIP in conjunction with other application layer protocols that provide services to a media communication session. For example, media identification and negotiation may be achieved with a Session Description Protocol (SDP). The multimedia communication system may also use real-time transport protocol (RTP) to provide transmission of media streams such as voice, video, or the like.

In some embodiments, a multimedia communication system may use a plurality of hosts to provide redundancy and reliability of server operations. For example, the multimedia communication system may use virtual router redundancy protocol (VRRP) to provide automatic assignment of available IP routers to network hosts. This may increase the availability and reliability of routing paths through gateway selections on an IP subnetwork. Using assignment of IP routers to network hosts may provide failover protection in the network. For example, each host may provide SIP services for a multimedia communication system. Accordingly, if one SIP server fails, an additional SIP server may serve as a replacement to provide SIP services. New calls that are established after the SIP server fails may then be handled by the additional SIP server. This additional SIP server may be referred to herein as a peer SIP server. However, existing calls on the original SIP server may not be valid at the peer SIP server. For example, if a user agent attempts to send a transmission through the peer SIP server, the peer SIP server has no session information for the multimedia communication session associated with the user agent. Therefore, in a conventional system, the peer SIP server rejects the transmissions from the user agent as invalid.

In order to provide continued service for a multimedia communication session, a multimedia communication system may store active session data for multimedia communication sessions in a data store separate from the SIP server handling the session. Therefore, in the event that a primary SIP server fails, the active session may be restored at a peer SIP server. In addition, in view of the maintenance and sharing of the active session data, active sessions may be provided with continuity of service. Furthermore, the active session data may be used to continue recording data related to the session. For example, the data may be used for determining an amount of time and a cost associated with the session for billing purposes.

In some embodiments, a peer SIP server in a multimedia communication system may use stored active session data to re-establish an active session at the peer SIP server after an original SIP server handling the communication fails. For example, the peer SIP server may use the stored active session data to generate a message communicated to both end points of a session which re-invites the end points to continue the active session (also referred to as a "Re-INVITE message". A Re-INVITE message may be used to update session information based on the peer SIP server, to check the status of user agents, or to establish in memory sessions at the peer SIP server. For example, the "Re-INVITE" message may update session information at one or more user agents or the SIP server. The information that identifies the session at the user agent may remain the same, but information related to the peer SIP server address may be changed. Rather than updating session information, the peer SIP server may use the Re-INVITE message to create a new session at the peer SIP server while maintaining the previous active session with the same session information at respective user agents. In effect, providing a Re-INVITE message to the user agent end-points of a multimedia communication session replicates the session on the peer server after the original SIP server fails. Providing the Re-INVITE message may also establish the session in a memory of the peer SIP server. For example, the Re-INVITE message may be generated by the peer SIP server when the session at the primary SIP server is establish at the peer SIP server. In some embodiments, the Re-INVITE message may also be used to check the status of the user agents in a session. For example, if a user agent does not respond to the Re-INVITE message, then the user agent may be considered to have terminated the session. Accordingly, an indication of the termination may be available to the peer SIP server to determine billing or usage.

In some embodiments, the active session information or Re-INVITE message may include one or more of, but not limited to, a From tag, a To tag, a Call-ID element, a call sequence (CSeq) element, a contact element, or session description protocol (SDP) data. A From tag may be originally generated by the user agent initiating a multimedia communication session and may uniquely identify the user agent. A To tag may be generated by the user agent receiving the original invitation to a multimedia communication session and may uniquely identify the receiving user agent. A Call-ID element may be a header field in the SIP protocol that identifies messages belonging to the multimedia communication session between the first user agent and the second user agent. A CSeq element may provide information to maintain the order of requests from a user agent. For example, the CSeq element may include a sequence number that maintains the order of requests. The contact element may be used to define the IP address and port a user agent is monitoring for requests from another user agent. The SDP data may describe the media parameters such as IP Address, Port, encoding capabilities, or the like of a user agent. For example the SDP data may include a description of file formats or encoding formats that a user agent is able to decode.

In order to re-establish a multimedia communication session, an active session data store may store session information for a plurality of active sessions handled by an active or primary SIP server. The active session information for a particular session may include any information relating to a session between two end points including, but not limited to, a session identifier, network locations (e.g., IP addresses) of user agent endpoints, a call start time, call features, or the like that are used to differentiate or identify the active session and provide services and continuity for the active session.

In an implementation, the multimedia communication system may determine that a primary SIP server has failed based on a notification from the primary SIP server or based on monitoring of the primary SIP server. For example, the primary SIP server may provide a notification to the multimedia communication system if the server is not operating correctly. In an implementation, the multimedia communication system may monitor the primary SIP server to determine if the server is operating correctly. For example, the multimedia communication system may determine that the primary SIP server has failed based on processing usage, memory usage, network status, or other information about the operation of the primary SIP server. In some embodiments, VRRP application may be used by the peer SIP server, or the multimedia communication system, to determine when there is a failover event. For example, a VRRP application may monitor the hardware or software of the primary SIP server to determine that there is a failover event.

In some embodiments, an active session data store may be operatively coupled to a peer server such that the peer server is configured to manage and process the active session upon a failure of the primary server. In some embodiments, the active session data store may be stored on a server separate from the primary server or the peer server. Accordingly, the active session information may be accessed by the peer server in response to determining that the primary server is not available.

In some embodiments, the multimedia communication system may include multiple peer SIP servers configured to receive, access, or store active session data for one or more primary SIP servers. For example, there may be multiple peer SIP servers that store all, or a part of, the active session information for a particular primary SIP server. Furthermore, in some embodiments, multiple SIP servers may store active session information for each other. For example, a first SIP server may store active session information for active sessions that it manages as well as active session information for a second SIP server. The second SIP server may also store active session information for active sessions that it manages as well as active session information for the first SIP server. The first and second SIP servers may then act as peer SIP servers for each other in case one of the SIP servers fails. In some embodiments, the failover management system may also store active session data for the primary SIP server or the peer SIP server.

In some embodiments, the active session information may include other information in addition to the information relating to re-establishing a multimedia communication session. For example, active session information may also include a recording of the session. Thus, if a voice call fails, a recording of the voice call may be stored in an active session data store such that the voice call can be continued on a peer SIP server when the active session is re-established on the peer SIP server. In some embodiments a copy of a voice recording may be stored on the peer SIP server or on the failover management system.

FIG. 1 is a block diagram of one illustrative example of a multimedia communication system that handles failover events of SIP servers while maintaining continuity of active multimedia communication sessions. The multimedia communication system may include a plurality of SIP servers 110 that manage active sessions from a plurality of user agents 120. The multimedia communication system may also include a failover management system 130 that manages failover events of one or more SIP servers 110.

In an implementation, the network 140 may include a packet switched network through which the communications between user agents 120 through SIP servers 110 may be established and maintained. User agents 120, SIP servers 110, and failover recover system 130 may be servers, mainframes, workstations, personal computers (PCs), mobile phones, portable computing devices, or the like. In addition, one or more of User agents 120, SIP servers 110, and failover recover system 130 may execute additional applications.

The user agents 120 may include a user agent client (UAC) 122 and a user agent server (UAS) 124. The UAC 122 may initiate requests to a SIP server to perform one or more actions related to an active session of the user agent 120. For example, the UAC 122 may request to initiate a call, terminate a call, hold a call, or perform other operations related to a call or other multimedia communication session. The UAS 124 may respond to requests from a SIP server. For example, the UAS 124 may respond to requests to accept a call or to terminate a call. The user agents 120 may be a SIP phone, a SIP server, or another endpoint capable of performing SIP services.

The SIP servers 110 may provide communication services between individual user agents 120. For example, the SIP server 110 may act as a registrar, a back-to-back user agent, a proxy server, a redirect server, or the like. The SIP server 110 may transmit signaling and communication messages from one user agent 120 to another user agent 120 to manage active sessions 112. The active sessions 112 may include information necessary to manage the respective active sessions 112 between multiple user agents 120. For example, an active session 112 may include a session identifier and tracking information regarding the session. In some embodiments, an SIP server 110 may include multiple active sessions 112. The active sessions 112 may be executed as individual processes on a SIP server 110, or may be managed by a management agent on the SIP server 110.

The failover management system 130 may manage failover events of one of the SIP servers 110. For example, in the event that a first SIP server 110 fails, the failover management system 130 may transfer control and management of active sessions 112 and new SIP sessions to a second SIP server 110. The failover management system 130 is shown in FIG. 1 as a separate entity from the SIP servers 110, however, in some embodiments, the failover management system 130 may be hosted on one or more of SIP servers 110. In some embodiments, the failover management system 130 may communicate with the first SIP server 110 or the second SIP server 110 using VRRP or another protocol to provide data related to active session information.

In order to recover from a failover event, the failover management system 130 may re-establish active sessions 112 from a first SIP server 110 on a second SIP server 110. In order to re-establish active sessions 112, the failover management system 130 may store active session information in an active sessions data store 115. The active session information may include, for example, information used to re-establish an active session on a new SIP server 110. While shown in FIG. 1 as a separate data store 115, in some embodiments, the active sessions data store 115 may be stored as part of the failover management system 130 or as part of one or more SIP servers 110. For example, a second SIP server 110 may store active session information in an active sessions data store 115 located on the same computing system.

The failover recover system 130 may use the active session information to send a Re-INVITE message to a first user agent 120 and a second user agent 120 that were in an active session at a time when the first SIP server 110 failed. The Re-INVITE message may cause the user agents 120 to continue an active session 112 on the new SIP server 110 without interruption or loss of continuity. In an implementation, in order to continue the active session 112 without interruption, the failover management system 130 may also reassign an IP address from the first SIP server 110 that failed to the second SIP server 110. Because the second SIP server 110 has the original IP address, transmissions from the user agents 120 may be directed to the new SIP server 110. In some embodiments, the Re-INVITE message may update the status of the SIP server at the user agents. For example, the peer SIP server may have different address information that is conveyed in the Re-INVITE message. In some embodiments, the Re-INVITE message may also establish the active sessions in the memory of the peer SIP server. The peer SIP server may also use the Re-INVITE message to check the status of user agents for the peer SIP server. For example, if a user agent does not respond to the Re-INVITE message, then the session may be considered terminated by that user agent. This may avoid stale information about the session to provide proper billing, usage, or other data regarding the session.

The active session information for an active session 112 may also include a start time for the session. The start time may be used by an SIP server 110 to track usage of the SIP servers 110. The usage may include an amount of time that the SIP servers 110 were used in order to handle billing and other operations for the multimedia communication system. Processes for re-establishing connections for a failed SIP server 110 between user agents 120 are discussed further below.

Figure 2A:
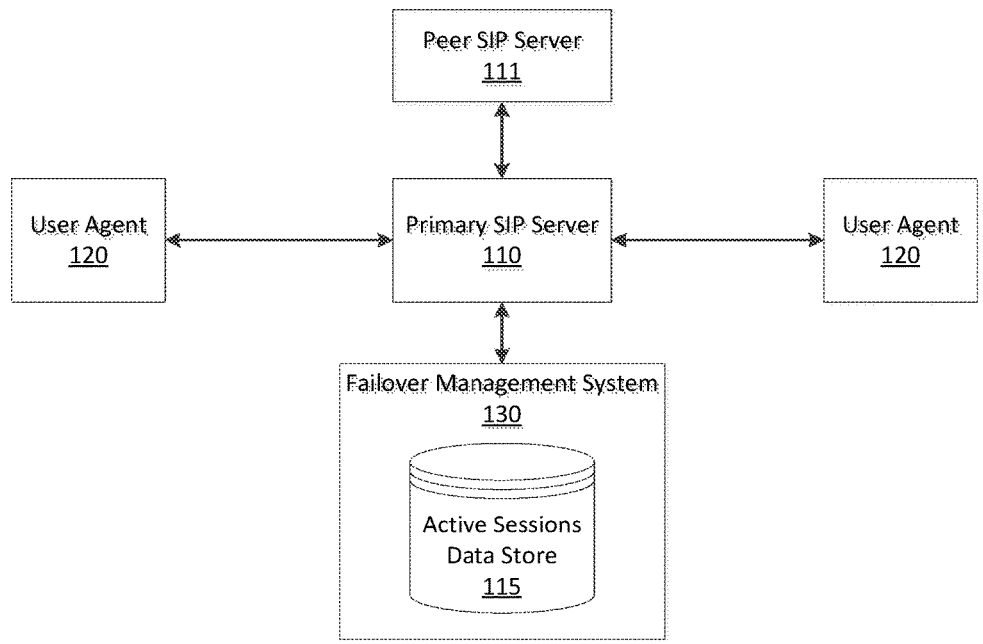
FIG. 2A depicts a block diagram of a failover management system, according to one or more aspects of the present disclosure.
Figure 2B:
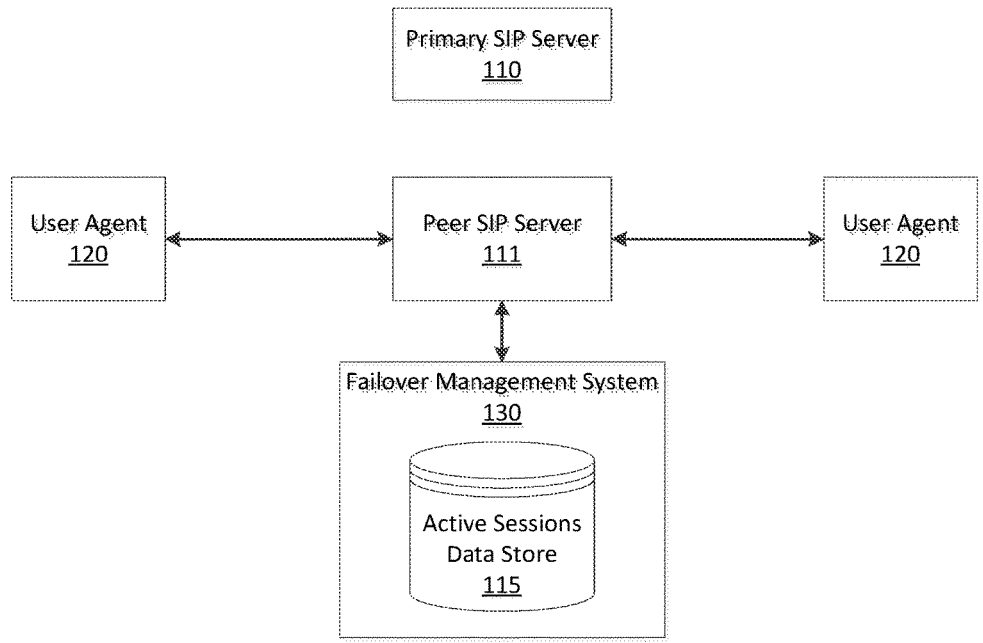
FIG. 2B depicts a block diagram of a failover management system, according to one or more aspects of the present disclosure.

FIGS. 2A and 2B are block diagrams of one illustrative example of a multimedia communication system that handles failover events of SIP servers while maintaining multimedia communication sessions. The multimedia communication system may include a primary SIP server 110 that manages active sessions associated with a plurality of user agents 120. The multimedia communication system may also include a failover management system 130 that manages failover events of the primary SIP server 110 and a peer SIP server 111 to manage SIP sessions in the event of a failover of the primary SIP server 110.

In FIG. 2A, the primary SIP server 110 may be managing active SIP sessions between user agents 120. The primary SIP server 110 may store active sessions information for the active sessions on an active sessions data store 115, for example, at a location remote to the primary SIP server 110. As shown in FIG. 2A, the active sessions data store 115 may be maintained by and associated with the failover management system 130. In some embodiments, the active sessions data store 115 may be separate from the failover management system 130. In addition, some features of the failover management system 130 may be provided on one or more of the SIP servers 110 or peer SIP server 111.

At some point, the primary SIP server 110 becomes unavailable (i.e., experiences a failover event). For example, the primary SIP server 110 may have an internal malfunction that requires a restart, may have a network connection fail, or may become unavailable to manage SIP sessions for another reason. In such instances, the failover management system 130 may detect that the primary SIP server 110 is down and transfer SIP management to the peer SIP server 111.

FIG. 2B is a block diagram of an illustrative example of a multimedia communications system after transferring control of SIP management to a peer SIP server 111. After detecting the failover event, the failover management system 130 may provide a notification to a peer SIP server 111 indicating that the peer SIP server 111 should manage the active sessions of the primary SIP server 110. The failover management system 130 may transfer an IP address from the primary SIP server 110 to the peer SIP server 111. The failover recover system 130 may also provide active session information from active sessions data store 115 to the peer SIP server 111 so that the peer SIP server 111 can provide continuous support for the active SIP sessions.

In response to receiving the notification from the failover management system 130, the peer SIP server 111 may begin receiving messages and transmissions from user agents 120 to generate new SIP connections or to manage active SIP sessions. The peer SIP server 111 may establish the new connections as requested. The peer SIP server 111 may also provide continuing service for active SIP sessions.

To provide continuous service for active SIP session from the primary SIP server 110, the peer SIP server 111 may re-establish the SIP session between itself and respective user agents 120 associated with the SIP session. For example, the SIP server may provide a Re-INVITE message to each user agent 120 in an active SIP session to update the SIP configuration information. The updated SIP configuration information for the active session may then be used by the user agents 120 and peer SIP server 111 to maintain the SIP session.

In some embodiments, the active session information may include a call start time, a ingress call identification, an egress call identification, a "from tag", a "to tag", an automatic number identification (ANI), a dialed number identification service (DNIS), an ingress IP address, an ingress port, an egress IP address, an egress port, an ingress command sequence (CSeq), an egress CSeq, an ingress RTP IP address, an ingress RTP port, an egress RTP IP, an egress RTP port, negotiated voice codes, a media packet time, or other attributes used to manage an SIP session. In an implementation, the call start time of the active session info may be used by the peer SIP server 111 to provide continuous billing through the failover event.

During operation, the peer SIP server 111 may continue to provide active session information to a failover management system 130. The additional active session information may be used in the event that the peer SIP server 111 also fails or in the event that the primary SIP server 110 comes back online. For example, a second peer SIP server may be available in the event that the peer SIP server 111 becomes unavailable. In some embodiments, the peer SIP server 111 may be inactive while the primary SIP server 110 is available and may be activated by the failover management system 130 in the event the primary SIP server 110 is unavailable. In some embodiments, the peer SIP server 111 may be active at the same time as the primary SIP server 110, but the servers may handle their own active sessions. The peer SIP server 111 may then handle both active sessions originated at the peer SIP server 111 and those from the unavailable primary SIP server 110.

Figure 3:
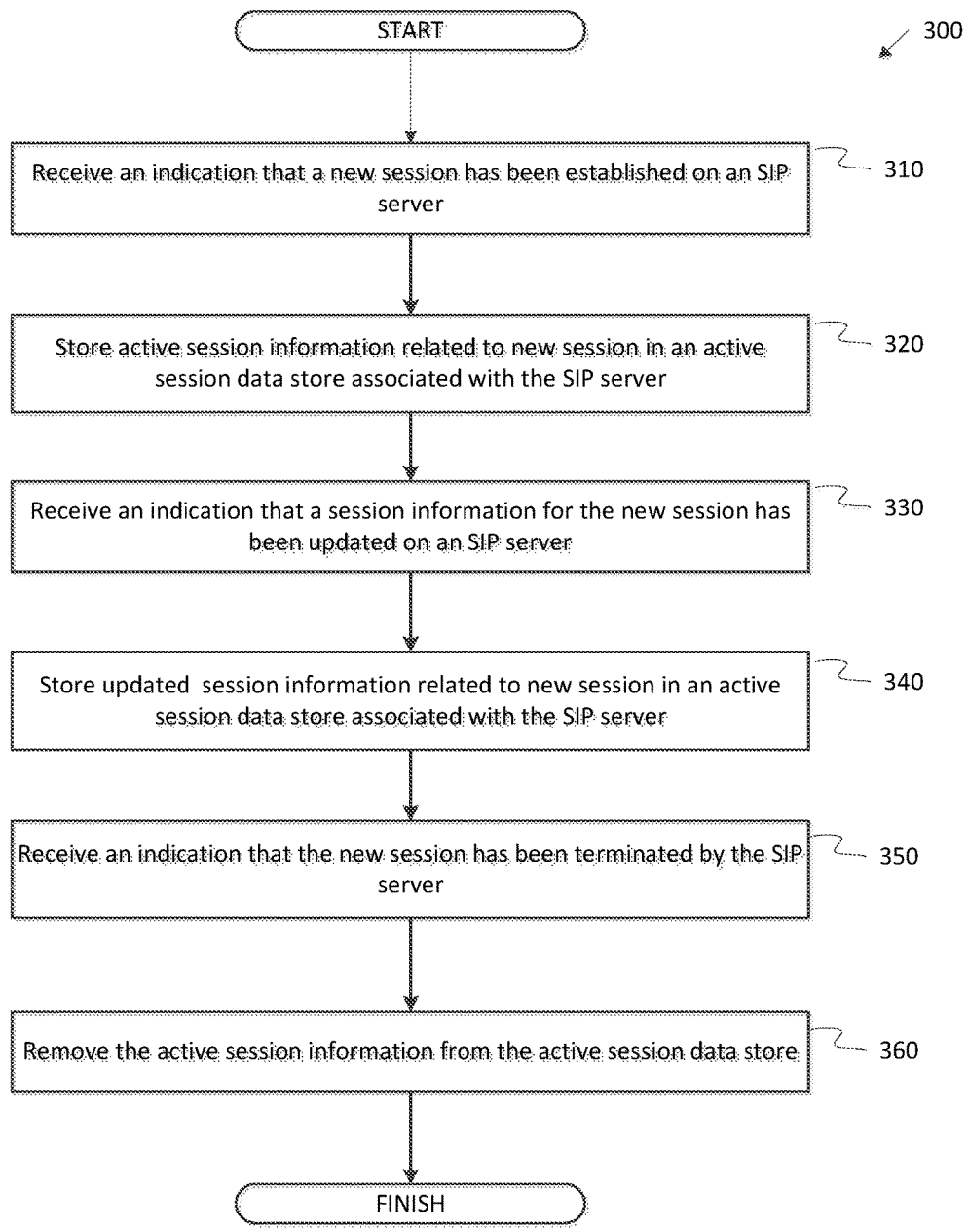
FIG. 3 is a flow diagram of a method provided for failover management, according to one or more aspects of the present disclosure.

FIG. 3 is a flow chart depicting a method 300 performed by a failover management system to manage active session information for an SIP server (also referred to as the "original" or "primary" SIP server). Beginning in block 310, the failover management system may receive an indication that an active session has been established on an SIP server. The indication may be received at the failover management system from the SIP server or the failover management system may detect the new session through monitoring of the SIP server.

In block 320, the failover management system may store the active session information related to the active session in an active session data store associated with the SIP server. The active session information may include information required to provide continuous service to the active session at a peer SIP in the event that the original or primary SIP server fails. In some embodiments, the failover management system may store the active session information at a location remote to the failover management system. In addition, the failover management system may store the active session information in more than one active session data store to provide further redundancy.

In block 330, the failover management system receives an indication that the session information for the session has been updated on the peer SIP server. For example, the active session information may change the configuration of user agents associated with the session or may change a networking configuration or setting of the peer SIP server. In response to the updated session information, the failover management system may continue to update the active session data store with the updated session information, in block 340. In an implementation, the active session data store may be updated in the same way that the session information was added in block 320. In some embodiments, the active session information may be updated whenever the first SIP Server received In Dialog messages such as Call Hold, SIP Info, SIP Update, or the like for active sessions.

In block 350, the failover management system receives an indication that the session has been terminated at the peer SIP server. For example, a user agent may have requested to terminate a call to another user agent. In response to receiving the indication that the session has been terminated, the failover management system may remove the active session information from the active session data store, in block 360. Accordingly, in the event of an SIP server failure, the failover management system does not attempt to re-establish the SIP session for a terminated session. In an implementation, upon termination of an active session, the session information may be removed from all locations (e.g., data stores) where it was stored.

Figure 4:
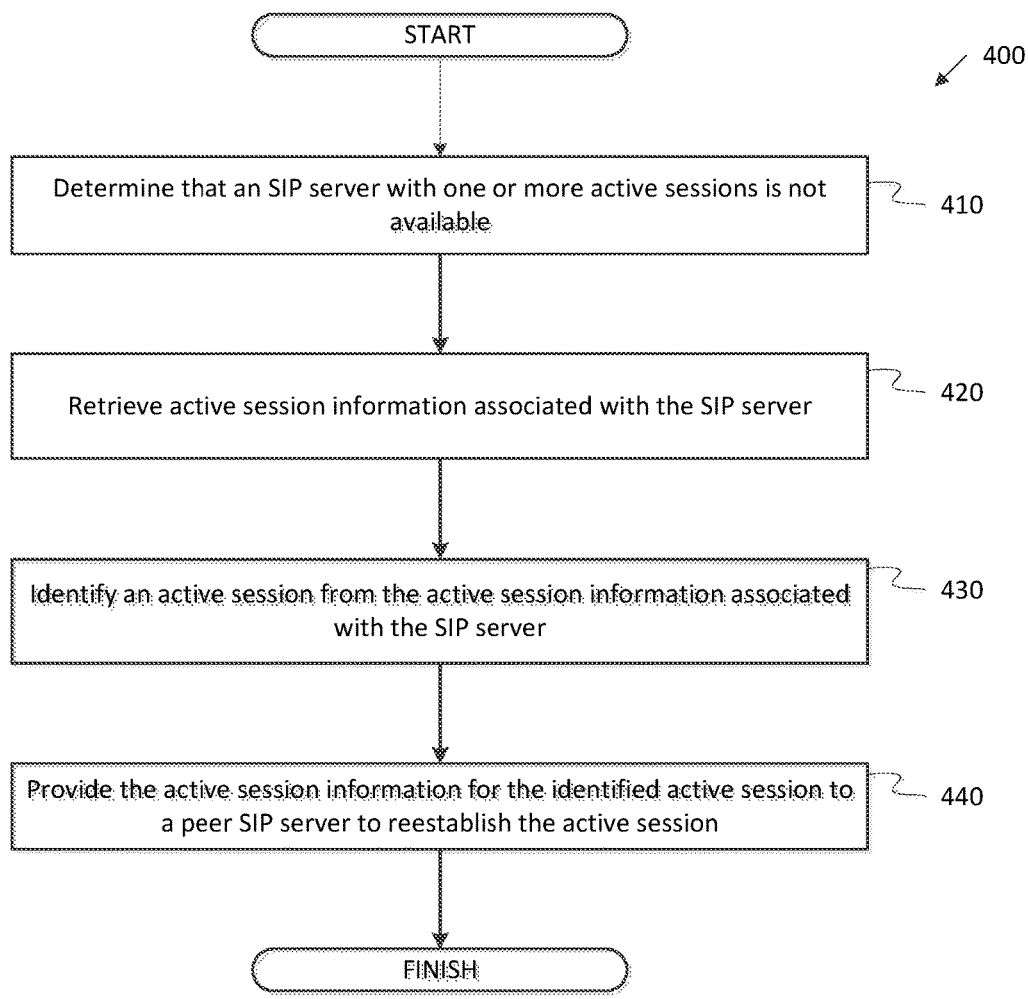
FIG. 4 is a flow diagram of a method provided for failover management, according to one or more aspects of the present disclosure.

FIG. 4 is a flow chart depicting a method 400 performed by a failover management system to recover from failure of an SIP server. In some embodiments, the method 400 may be performed by the same failover management system described with reference to method 300 above. For example, the method 400 may be performed by a failover management system before the SIP session was terminated in method 300.

Beginning in block 410, the failover management system determines that an SIP server with one or more active sessions is not available. For example, the SIP server may receive a notification indicating the SIP server is not available or may determine that the SIP server is not available in response to monitoring the operation of the SIP server. For example, the failover management system may determine that an SIP server is not available based on responses received to communications to the SIP server, based on hardware or software operation of the SIP server, or based on networking information available to the failover management system.

In block 420, the failover management system retrieves active session information associated with the unavailable SIP server. For example, the active session information may be stored in an active session data store accessible to the failover management system. Then, in block 430, the failover management system may identify an active session from the active session information associated with the SIP server. For example, the active session may be identified based on a session ID.

In block 440, the failover management system provides the active session information for the identified active session to a peer SIP server to re-establish the active session. In some embodiments, the failover management system may provide the active session ID and the peer SIP server may access the active session information from the active session data store. The failover management system may continue to re-establish sessions on one or more peer SIP servers from the unavailable SIP server. In some embodiments, the failover management system may provide the active session information directly to a peer SIP server to determine the active sessions to re-establish. The failover management system may also reassign an IP or other network address to the peer SIP server so that transmissions and messages from the active sessions are provided to the peer SIP server as it manages SIP sessions.

Figure 5:
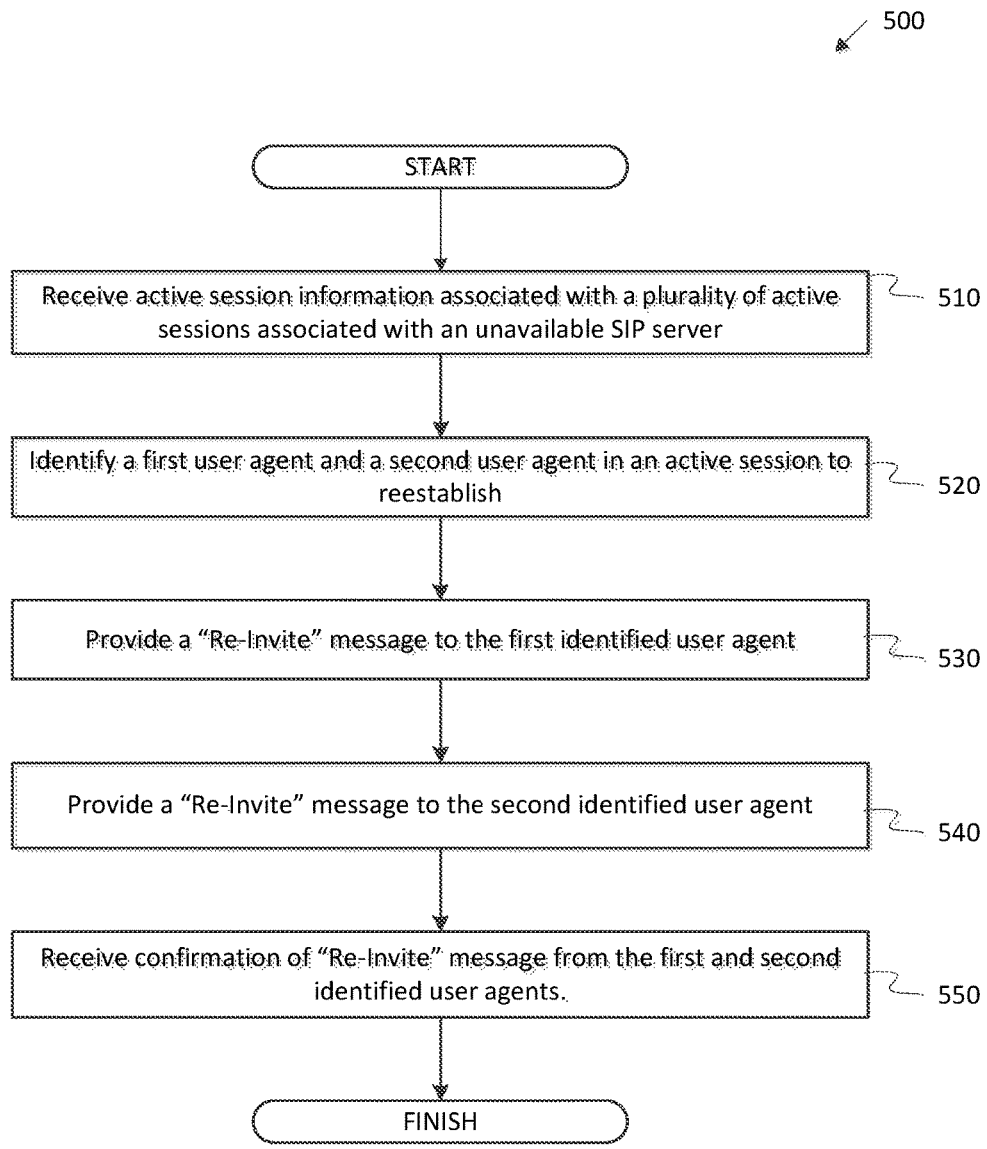
FIG. 5 is a flow diagram of a method provided for failover management, according to one or more aspects of the present disclosure.

FIG. 5 is a flow chart depicting a method 500 performed by a peer SIP server to recover from a failure of an SIP server. Beginning in block 510, the peer SIP server receives active session information associated with a plurality of sessions associated with an unavailable SIP server. For example, the peer SIP server may receive the active session information from a failover management system. In some embodiments, the peer SIP server may receive an indication that an SIP server has failed and may access the active session information at an active session data store.

In block 520, the peer SIP server may identify user agents in an active session that is to be re-established. The user agents may be identified by IP address, identifiers, or the like. After identifying the user agents, the SIP server may provide a Re-INVITE message to each of the user agents in blocks 530 and 540. For example, the Re-INVITE message may provide updated SIP information to the user agents to direct communications to the peer SIP server. Then, in block 550, the peer SIP server may receive confirmation of the Re-INVITE message from the first and second user agents. For example, the first and second user agents may send an "OK" message acknowledging the updated SIP information. In some embodiments, the peer SIP server may send and "ACK" message to the first and second user agents to confirm that the message was received.

Accordingly, the active session from the unavailable SIP server may be re-established at the peer SIP server. The user agents associated with the SIP server may update SIP session information based on the Re-INVITE message, but otherwise may experience continuous service for the SIP session. Furthermore, the peer SIP server may have information necessary to provide continuous SIP service as well as to provide billing and tracking of the multimedia session.

Figure 6:
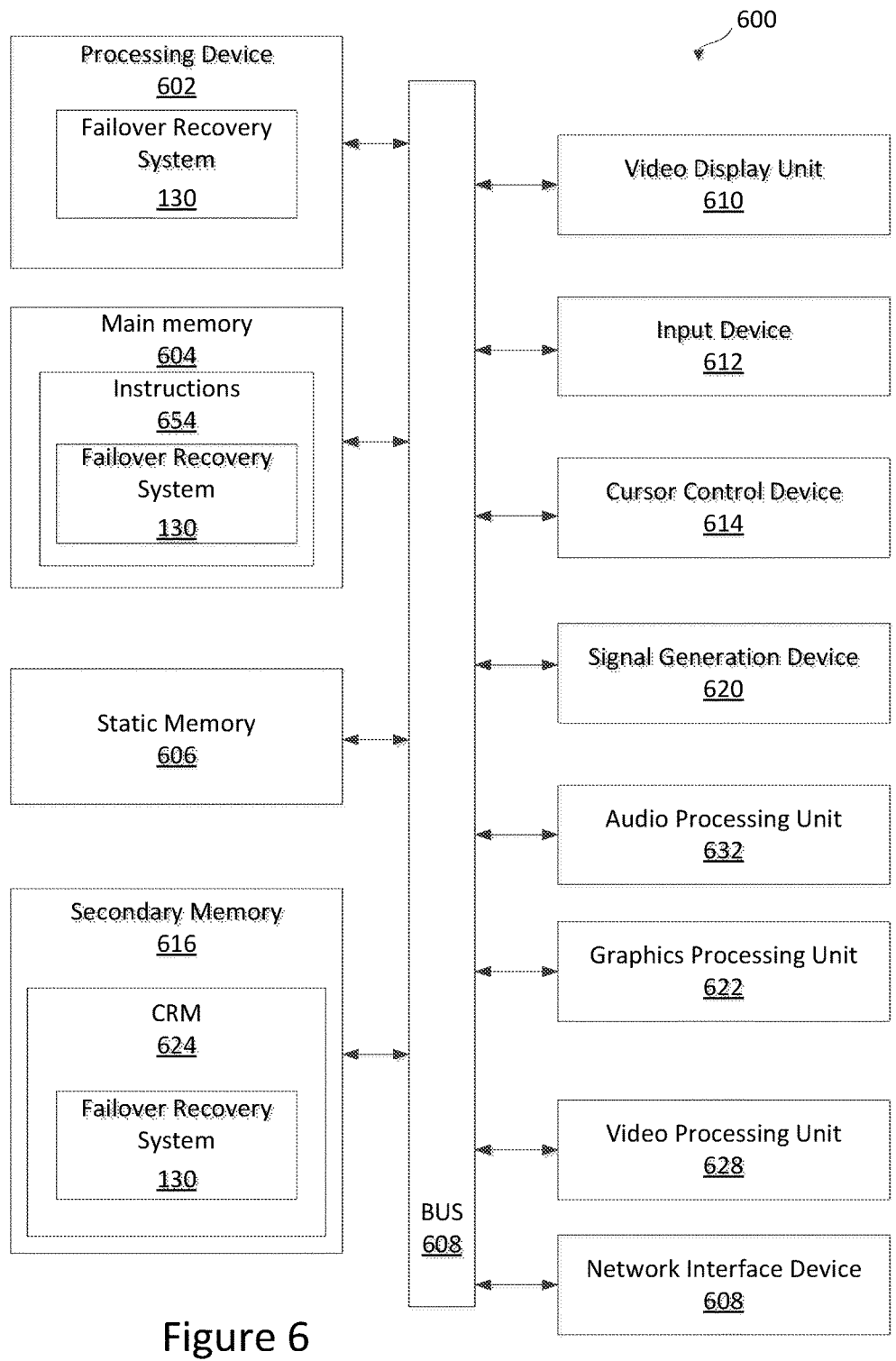
FIG. 6 is a block diagram of an example computer system operating in accordance with one or more aspects of the present disclosure.

FIG. 6 depicts an example computer system 600 which can perform any one or more of the methods described herein for providing failover management of SIP sessions. In one example, computer system 600 may correspond to a failover management system 130, an SIP server 110, or a peer SIP server 111 as described in the figures. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like. The computer system 600 may include a graphics processing unit 622, a video processing unit 628, and an audio processing unit 632.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium (CRM)) 624 on which is stored one or more sets of instructions embodying any one or more of the methodologies or functions described herein (e.g., a failover management system 130, SIP server, or peer SIP server). The main memory 604 may also store, completely or partially, instructions 654 embodying any one or more of the methodologies or functions described herein (e.g., a failover management system 130, SIP server, or peer SIP server). Furthermore, the processing device 602 may include instructions to implement a failover management system 130, SIP server, or peer SIP server during execution thereof by the computer system 600. The main memory 604 and the processing device 602 may also include machine-readable storage media.

While the computer-readable storage medium 624 is shown in an exemplary implementation to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

The modules, components and other features described herein (for example in relation to FIG. 1, 2A or 2B) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "creating", "receiving", "determining", "executing", "performing," "transferring," "translating," "assigning," "reassigning," "identifying," "providing," "associating," "retrieving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific exemplary implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

What is claimed is:

1. A method comprising:
storing, in a data store, active session information received from a first session initiation protocol (SIP) server for an active session between a first user agent and a second user agent, wherein the active session is associated with the first SIP server;
providing, by a processing device, in response to a determination that the first SIP server is unavailable, the active session information to a second SIP server to maintain continuity of the active session between the first user agent and the second user agent; and
causing the second SIP server to generate a first Re-INVITE message to provide to the first user agent and a second Re-INVITE message to provide to the second user agent, wherein the first Re-INVITE message comprises at least a portion of the active session information to continue the active session.

2. The method of claim 1, further comprising:
determining that a new active session has been initiated on the first SIP server; and
storing new active session information associated with the new active session in the data store.

3. The method of claim 1, further comprising:
determining that the active session has updated session information; and
updating, in the data store, the active session information associated with the active session based on the updated session information.

4. The method of claim 1, further comprising:
determining that the active session has been terminated; and
removing, from the data store, the active session information associated with the active session.

5. The method of claim 1, wherein determining that the first SIP server is unavailable comprises:
monitoring, by the processing device, operation of the first SIP server; and
determining that the first SIP server is unresponsive to a request from the first user agent.

6. The method of claim 1, further comprising re-assigning an IP address associated with the first SIP server to the second SIP server in response to determining that the first SIP server is unavailable.

7. The method of claim 1, wherein the active session information comprises one or more of a From Tag, a To Tag, a Call-ID element, a call sequence (CSeq) element, a contact element, or session description protocol (SDP) data.

8. The method of claim 1, wherein the active session information comprises a start time and wherein the method further comprises causing the second SIP server to maintain billing for the active session based on the start time.

9. An apparatus comprising:
a memory device; and
a processing device operatively coupled to the memory device, the processing device to:
receive active session information associated with a plurality of active sessions associated with a first session initiation protocol (SIP) server that is unavailable;
identify a first user agent and a second user agent associated with an active session of the plurality of active sessions; and
generate a first Re-INVITE message to provide to the first user agent and a second Re-INVITE message to provide to the second user agent to continue the active session.

10. The apparatus of claim 9, wherein the first Re-INVITE message to the first user agent comprises one or more of a From tag, a To tag, a Call-ID element, a call sequence (CSeq) element, a contact element, or session description protocol (SDP) data.

11. The apparatus of claim 9, wherein the processing device is further to:
determine that the active session has updated session information; and
update active session information stored in a data store based on the updated session information.

12. The apparatus of claim 9, wherein to receive the active session information, the processing device is further to:
receive a notification indicating that the first SIP server is unavailable; and
access the active session information at a data store associated with the unavailable SIP server.

13. The apparatus of claim 9, wherein the active session information includes a start time for the active session, and wherein the processing device is further to use the start time to generate billing information for the active session.

14. The apparatus of claim 9, wherein the processing device is further to:
receive a notification indicating that the first SIP server is unavailable: and
transition from a passive mode to an active mode in response to the notification indicating that the first SIP server is unavailable.

15. The apparatus of claim 9, wherein the processing device is further to:
determine that the first Re-INVITE message has not been accepted by the first user agent; and
in response to the first Re-INVITE message not being accepted:
remove a first portion of active session information associated with the active session; and
clear the active session at the peer SIP server.

16. A system comprising:
a first server to manage a plurality of multimedia communication sessions comprising a first multimedia communication session associated with a first user agent and a second user agent;
a second server capable of handling multimedia communication sessions; and
a failover management system comprising a memory device and a processing device operatively coupled to the memory device, the processing device to:
store active session information associated with the first multimedia communication session in the data store; and
re-establish, in response to a determination that the first server is unavailable, the first multimedia communication session on the second server based on the active session information in the data store by generating a first message to provide to the first user agent and a second message to provide to the second user agent to continue the first multimedia communication session.

17. The system of claim 16, wherein to re-establish the plurality of multimedia communication sessions on the second server, the processing device to provide a notification to the second server that the first server is unavailable.

18. The system of claim 17, wherein, in response to the notification, the second server is to:
access active session information associated with the multimedia communications session in the data store; and
identify the first user agent and the second user agent associated with the first multimedia communication session.

19. The system of claim 16, wherein to determine that the first server is unavailable, the processing device of the failover management system is to monitor the operation of the first server.

20. The system of claim 16, wherein the processing device of the failover management system is further to reassign an IP address from the first server to the second server in response to determining that the first server is unavailable.

* * * * *